US010887857B2

(12) United States Patent
Thalanany et al.

(10) Patent No.: US 10,887,857 B2
(45) Date of Patent: Jan. 5, 2021

(54) INTERIOR CLIMATE CONTROL AUGMENTATION BY PERSONAL COMFORT DATA PROVIDED VIA WIRELESS WEARABLE DEVICE COMMUNICATIONS

(71) Applicant: United States Cellular Corporation, Chicago, IL (US)

(72) Inventors: Sebastian Thalanany, Buffalo Grove, IL (US); Narothum Saxena, Hoffman Estates, IL (US); Michael S. Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 0 days.

(21) Appl. No.: 16/234,139

(22) Filed: Dec. 27, 2018

(65) Prior Publication Data
US 2019/0208488 A1 Jul. 4, 2019

Related U.S. Application Data

(60) Provisional application No. 62/611,117, filed on Dec. 28, 2017.

(51) Int. Cl.
H04W 4/70 (2018.01)
H04W 60/00 (2009.01)
H04B 1/3827 (2015.01)
H04W 4/38 (2018.01)

(52) U.S. Cl.
CPC ............ *H04W 60/00* (2013.01); *H04B 1/385* (2013.01); *H04W 4/38* (2018.02); *H04W 4/70* (2018.02)

(58) Field of Classification Search
CPC ......... H04W 60/00; H04W 4/70; H04B 1/385
See application file for complete search history.

(56) References Cited

U.S. PATENT DOCUMENTS

2015/0373022 A1* 12/2015 Dubman ............. H04L 12/2825 726/3
2017/0332357 A1* 11/2017 Xu ......................... H04W 4/029

* cited by examiner

Primary Examiner — Chuong A Ngo
(74) Attorney, Agent, or Firm — Leydig, Voit & Mayer, Ltd.

(57) ABSTRACT

An affective computing server (ACS) is described herein that is incorporated into a mobile wireless network management infrastructure. The ACS is configured to carry out a method over a mobile wireless network for maintaining a comfort status of a user of a wearable device. The ACS registers the wearable device associated with the user. The ACS receives, via a mobile wireless technology link, a user comfort status profile (UCSP) message issued by the wearable device, where the UCSP message includes at least a parameter value indicative of the comfort status of the user. The ACS processes the UCSP message to render a comfort control request based upon the UCSP. The ACS causes a sending of the comfort control request over a mobile wireless technology to an actuator (e.g. a heating/air conditioning system) for affecting a change in the comfort status of the user of the wearable device.

20 Claims, 7 Drawing Sheets

| Service Type (ST) | Service Type Description (STD) | Service Parameter (SP) | Service Action (SA) |
|---|---|---|---|
| Living Space Climate Information (LSCI) detected automatically, using RPWD configurations selected by the user. | Adapt the living space climate to selected or automatic settings to suit personal preference | Temperature, Humidity, Lighting, Air de-ionizer, Air flow | The RPWD interacts with the local server to detect, manage, and control the actuator(s), based on a personal preference profile. |
| User Bio-marker Information (UBI) for monitoring and mediation of SP, based on configured capabilities in the RPWD | Leveraging of bio-marker measurements for delivering non-invasive well-being status, and recommending customized protocols for enhancing health, and the quality of life | Heart rate variability; Galvanic skin resistance; Blood glucose; Blood pressure; Body temperature; Other parameters can be configured based on sensor capabilities | The RPWD interacts with the local server to detect the configured biomarker parameters and provide curated recommendations on mediation guidance. Additionally, based on the RPWD actuator capabilities, dispensing of biomarker triggered preventive or treatment medication, aligned with a personal profile can be configured. |

FIG 3

INTERIOR CLIMATE CONTROL AUGMENTATION BY PERSONAL COMFORT DATA PROVIDED VIA WIRELESS WEARABLE DEVICE COMMUNICATIONS

CROSS-REFERENCE TO RELATED APPLICATION

This application is a non-provisional of U.S. Provisional Application Ser. No. 62/611,117, filed Dec. 28, 2017, entitled "COMFORT CONTROL AUGMENTATION BY PERSONAL COMFORT DATA PROVIDED VIA WIRELESS WEARABLE DEVICE COMMUNICATIONS," the contents of which are expressly incorporated herein by reference in their entirety, including any references therein.

FIELD OF THE INVENTION

This invention relates generally to the fields of portable/wearable wireless device communications and indoor living space climate control (e.g., heating, ventilation and air conditioning) systems. More particularly, the invention is directed to networked indoor climate control systems augmented with wireless remote communications interfacing capabilities to receive input from portable/wearable devices indicative of conditions at locations remote to a central controller of the indoor climate control system.

BACKGROUND OF THE INVENTION

Presently, the layout of indoor environments, and the structural positioning of the environment, with respect to the movement of sun and the impacts of different modalities of heat transfer—radiant, convective, and conductive induce variations in the indoor ambient climate, across different locations, within any given indoor environment. These variations typically induce an uneven distribution of climate in a captive environment that has any level of complexity, in terms of a multiplicity of structural topologies and enclosures with a diverse assortment of aesthetically and environmentally tuned materials and surfaces. These indoor environments may be residential, commercial, static or mobile. The applicability of tuned indoor climate spaces is relevant in the context of smart cities, homes, and living spaces anywhere, where the proposed system and method of operation facilitates adapting an environment to suit customized/personalized choices, optimized to potentially maximize comfort/satisfaction based upon collective preferences of potentially many users.

Such a diversity of indoor environments within a managed space results in a variable distribution of the ambient temperature indoors. Rigid or static thermostats are unable to adapt dynamically to suit the comfort of people within diversely conditioned subspaces within an indoor habitat. The proposed system and method described herein addresses a need, to suit the individual comfort choices of people in an indoor habitat, to provide a dynamically tunable indoor climate control profile. The tuning of an indoor climate profile consists of an adaptation of the indoor climate profile to suit unique physiological, psychological, and comfort profiles of individuals currently inhabiting such spaces. Existing and traditional methods rendered by thermostats and the like are static (once programmed) and are relatively rudimentary in aligning with the dynamic nature of ambient conditions within indoor environments. The existing techniques are simply inadequate for providing experiential advancements to climate control to suit current inhabitants instantaneous comfort and needs.

SUMMARY OF THE INVENTION

Embodiments of the invention are used to provide a system and method for dynamically and responsively managing the status of a controlled indoor ambient climate, for a customizable comfort and wellness experience of currently present individuals. As such, an affective computing server (ACS) is described herein that is incorporated into a mobile wireless network management infrastructure. The ACS includes a processor and a non-transitory computer-readable medium including computer-executable instructions for carrying out a method over a mobile wireless network for maintaining a comfort status of a user of a wearable device. The method includes registering, by an affective computing server (ACS), the wearable device associated with the user. Thereafter, the ACS receives, via a mobile wireless technology link, a user comfort status profile (UCSP) message issued by the wearable device, where the UCSP message includes at least a parameter value indicative of the comfort status of the user. The ACS processes the UCSP message to render a comfort control request based upon the UCSP. The ACS causes a sending of the comfort control request over a mobile wireless technology to an actuator (e.g. a heating/air conditioning system) for affecting a change in the comfort status of the user of the wearable device.

The present invention is furthermore embodied in a non-transitory computer readable medium containing computer-executable instructions that, when executed, carry out the above-summarized methodology on an ACS. The invention is also embodied in a method carried out by an ACS.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIG. 3 summarizes a set of fields of an exemplary user comfort status profile (UCSP) sent by a remote portable-wearable device (RPWD) conveying information to an ACS;

DETAILED DESCRIPTION OF THE DRAWINGS

Figure 1:
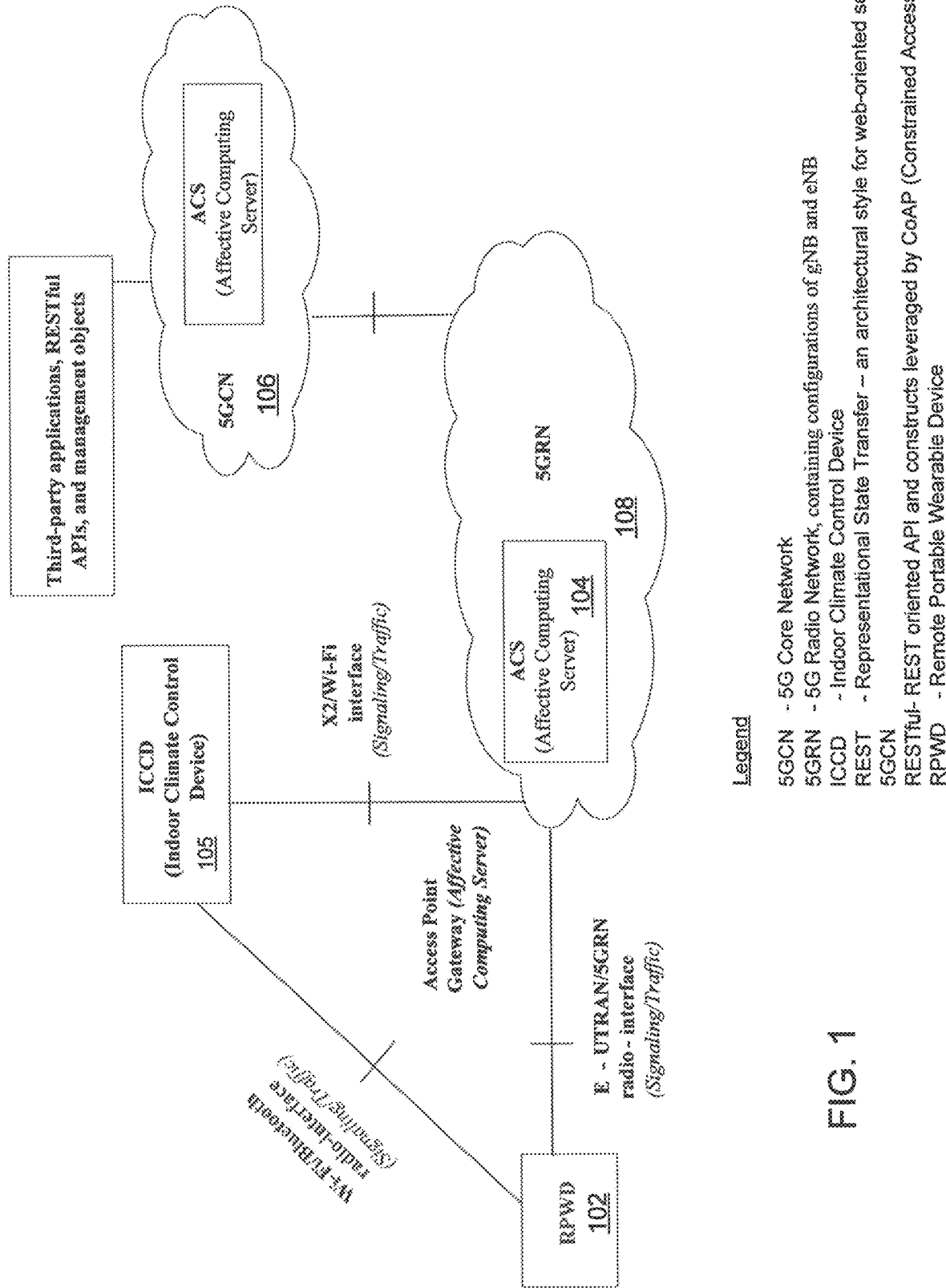
FIG. 1 is a schematic diagram illustrating a mobile wireless network environment suitable for carrying out the described system.

A dynamic customization of the indoor climate control settings, to suit individual comfort profiles is foundational in this disclosure. With the essence of the disclosure consisting of experiential well-being, a comfort profile, which is provided by users via communicated data generated and sent via a wearable device or other suitable portable personal communication apparatus, is both defined by certain default fields and extensible to facilitate the inclusion of additional biomarkers representative of user comfort level. The biomarkers may be sensed via the wearable device. The biomarker readings are conveyed, for example, to a server-mediated virtualized environment in which wireless communications are supported, for example, by a 5G core network. The server mediated virtualized environment provides curated and customized responses to the wearable sensor detected user biomarker data, where the responses are customized to previously registered preferences of the particular user(s). The responses, such as environmental control decisions and commands, provide guidance on preventive or treatment protocols for remedial actions that enhance self-directed well-being/comfort of the affected users.

The described enabling methods rely on and utilize a rendering of experiential well-being facilitated by a virtualized heterogeneous access and 5G core network system. The modalities of experiential well-being include climate adaptation for indoor living spaces and biomarker sensing customized for user-specific choices, together with wellness monitoring and guidance. The layout of indoor living spaces and the structural positioning of the living space—stationary or mobile—with respect to the movement of sun have an impact on the different modalities of heat transfer—including radiant, conducted and convection oriented. Biomarker sensing consisting of samples of sweat, heart-rate variability (a stress level indicator), blood pressure, galvanic skin resistance, among others is leveraged to estimate the status of the physiological and cognitive status of the user. In the illustrative examples provided herein, the biomarker sensing capability is arranged and configured in a wearable device.

The system described herein includes operations driven by a combination of heuristics and protocol extensions. The communications between sources of user data (e.g. biomarkers, physical location, etc.) are carried out via one or more of a variety of wireless technologies that operate at the edges of an access network closer to the user for an enhanced service experience. The solution may incorporate a combination of heuristics and protocol extensions, over 5GNR (New Radio) and LTE, and using licensed or unlicensed spectrum. The solution may also incorporate any one or more of the Wireless Local Area Network (WLAN) suite of radio-access technologies. Collectively, the heterogeneous access technologies are leveraged over a framework of capabilities at the edges of access networks referred to as Multi-access Edge Computing (MEC). MEC utilizes a cloud paradigm that includes: virtualized functions, computing resources, and storage resources. The heterogeneous wireless access technologies are connected to a virtualized framework in, for example, a 5G core network (5GCN). The modality of user application (e.g., biomarker sensors, user identification, current user location, etc.) is in the form of a wearable device that is configured to render a set of data values corresponding to a customizable representation of current experiential well-being definition/status.

The functional entities in the 5GCN comprise a collection of virtual functions that operate over a generic, high reliability, high availability hardware platform. The functional entities include an access and mobility function (AMF), a session management function (SMF), a user plane function (UPF), an authentication server function (AUSF), and a user data management (UDM) repository containing the user subscription profile related information.

The following is a listing of abbreviations used herein and their expanded terms:
5GCN: Fifth Generation Core Network
5GNR: Fifth Generation. New Radio access technology
5GRN: Fifth Generation Radio Network consisting of gNBs only or gNBs and eNBs
L-ACS: local—affective computing server that interacts with the RPWD and is located in the hosting domain
ACS: affective computing server
AF: application function
AMF: access and mobility function
APGF: access point gateway function
AUSF: authentication server function
CoAP: constrained application protocol
BAF: biomarker application function
BSP: biomarker service profile
eNB: E-UTRA Node B (4G base station)
gNB: g Node B (5G base station using 5G NR access technology)
H-ACS: home—affective computing server located in the hosted domain that interacts with the RPWD
HTTP: Hyper Text Transfer Protocol
LSCE: living space climate information
LWM2M: Light Weight Machine to Machine protocol
$N_{AF}$: Service-based interface exhibited by AF
$N_{AMF}$: Service-based interface exhibited by AMF
$N_{SMF}$: Service-based interface exhibited by SMF
$N_{UDM}$: Service-based interface exhibited by UDM
REST: Representational State Transfer
RESTful API: REST oriented application programming interface (API) that leverages the HTTP requests to GET, PUT, POST and DELETE data.
RPWD: remote portable-wearable device consisting of sensor and feedback elements, enabled with one or more radio access technologies
SMF: session management function
UBI: user biomarker information
UCSP: user comfort and service frofile, which consists of LSCI and UBE, based on RPWD configuration
UDM: user data management
UDR: user data repository
UPF: user plane function
Xn: side-link (logical interface among eNBs and gNBs)

The figures and associated written description provide illustrative examples of a system and method for supporting and carrying out an environmental (e.g. HVAC) control for an enclosed space. The control decisions and subsequent remedial instructions/commands to HVAC components are enabled informed by detection of individual users' biomarker sets provided by wearable devices and other personal portable communication devices, as well as, optionally/additionally, configured preferences of users.

Turning to FIG. 1, a schematic diagram depicts physical; structural components of an illustrative example of the above-summarized system that is carried out in an exemplary mobile wireless communication network environment. In the illustrative example provided in FIG. 1, the detection of temperature and humidity occurs via sensors in a remote portable wearable device (RPWD) 102 which interacts with an affective computing server (ACS) 104 over heterogeneous radio technology links and interfaces—5G, LTE, Wi-Fi or Bluetooth, where the ACS 104 is connected to the RPWD 102 over any standardized radio-access technology. Variants of the ACS 104 are provided. For example, the L-ACS version of the ACS serves as a conduit to a macro system for service subscription management. The H-ACS version of the ACS receives inputs from the RPWD 102, processes the input, and controls indoor environmental control actuators to suit the needs/preferences based upon the input received from the RPWD 102 of a user. It should be understood that the network environment depicted in FIG. 1 is substantially simplified, as one skilled in the art would readily observe, to focus upon the fundamental aspects of the described system that facilitate the objectives identified herein above. Both the RPWD 102 and the ACS are capable of communicating with an indoor climate control device (ICCD) 105 (e.g. HVAC equipment) via mobile wireless network technologies.

The 5G system architecture incorporated into the system depicted in FIG. 1 supports multi-access (e.g. fixed-wireless or other access technologies) edge computing, over 5GRN access technology, for both mobile and fixed-wireless connectivity of the RPWD with the L-ACS at the network edge.

The RPWD represents an IoT device that has a variety of usage scenarios that include the following three categories of capabilities for ambient comfort and self-directed wellbeing: local climate adaptation; low-latency, high-reliability, and widely ranging hit-rates that enable biomarker guided, self-directed wellbeing; and correlated combination of local climate adaptation and biomarker guidance.

The 5G system architecture incorporated into the system illustratively depicted in FIG. 1 uses a service based architecture (SBA) design that includes a framework of virtualized functions for a common 5GCN architecture 106 and a flexible 5GNR arrangement 108 to suit a variety of 5G use cases that are harnessed to provide connectivity together with computing, storage and database resources for the RPWD 102 at the edge of the 5G network depicted, by way of example, in FIG. 1.

The RPWD 102 system utilizes an SBA model of the 5G system, which consists of virtual functions and network slicing capabilities. The RPWD 102 system utilizes the network slicing capabilities of the 5G system for an allocation of the required system resources required to support the wireless data communication functions of the RPWD 102 system.

In the 5G system architecture depicted in FIG. 1, the SBA framework of virtual functions interact with each other, on an as needed basis, to support the RPWD 102 over a low-latency, high-reliability network slice. The SBA framework provides a functionality to authenticate the RPWD 102 and to authorize authenticated RPWD service requests. Within the SBA framework, there are functions that consume services and those that produce services. Additionally, any network function can offer one or more services.

The RPWD 102 utilizes the SBA framework within the 5G system for services and information requests using a request-response model. A subscribe-notify model is harnessed for relatively longer-term services.

An application programming interface (API) suite utilizes REST (representational state transfer)-oriented APIs, in the SBA framework, where the H-ACS in the home domain 5GCN of the RPWD is an application function (AF). The API suite utilizes the services registration, service discovery, availability notifications, de-registration and authentication and authorization capabilities in the SBA.

An AMF provides authentication, authorization and mobility management services for the RPWD 102. Heterogeneous access technologies in the illustrative system depicted in FIG. 1 are characterized by both different radio access technologies and different coverage footprints. The AMF handles access for the RPWD 102 over the heterogeneous access media. The SMF manages the RPWD 102 session and allocation of the Internet Protocol (IP) address for the RPWD 102. The SMF controls the UPF for data traffic between the RPWD 102 and the 5GCN. Different executing instances of the SMF are allocated for each RPWD 102, where different modes or capabilities are required for each of the different sessions that are instantiated. The application function (AF) provides information on the packet flow pertaining to an application invoked by the RPWD 102 to the policy control function (PCF), which handles the quality of service (QoS) and reflects the quality of experience (QoE). The PCF establishes policies pertaining to the RPWD 102 session management and mobility, via the operation of the AMF and one or more SMF instances. The authentication information, such as credentials of the RPWD 102 is stored in the AUSF, while the UDM stores the subscription information associated with the RPWD 102.

The architectural models that are harnessed in various embodiments of the system described herein, utilize a oneM2M architectural model, access-points, X2 oriented interfaces, and the Light-weight Machine to Machine (LWM2M) protocol, specified in OMA. The idea of the systems described herein, by way of example, spans interdisciplinary and interdependent perspectives across vertical and horizontal dimensions of system-level considerations. This approach astutely avoids the rigidity of silos for leveraging opportunistic capabilities across a large and growing category of connected devices—those with limited network bandwidth, computing power and memory, including those depending on a limited battery lifetime. At the same time the utilization of interoperable interfaces and well-defined protocols enables widespread applicability, while moving towards new paradigms of experientially attractive services over a massive Internet of Things (IoT) networked device environment.

The elements of the system that interact with a wearable sensing device consist mainly of the RPWD, the ACS, local access gateways (licensed or unlicensed), macro access gateways (licensed or unlicensed), and core networks (4G or 5G). A separation of the control plane (CP) and the user plane (UP), together with the virtualization and the distributed nature of the participating elements allows for flexibility in the realization of a customized indoor climate control for a variety of living spaces, whether static or mobile.

The illustrative mobile wireless network depicted in FIG. 1 includes 5G base stations (gNBs) and 4G base stations (eNBs), where gNBs operate in the spectrum ranges below 6 GHz and in the mmWave (millimeter wave) spectrum range above 24 GHz, and eNBs operate in the spectrum range below 6 GHz, with both CP and UP terminations at the RPWD and logical interfaces among the eNBs and the gNBs.

The expanded functions and interfaces of the 5GRN 108 and the 5GCN 106, discussed herein above (e.g., UDM, AMP, SFM, UPF, etc.) with reference to those elements in FIG. 1, are illustratively depicted in an enhanced schematic depiction of an illustrative system environment in FIG. 2. These functional components of the 5GRN 108 and the 5GCN 106 act in concert to facilitate the required mobility and application layer support for the features and capabilities of a personal local ambient climate and well-being detection functionality provided and managed by the RPWD 102.

Reconfigurability and flexibility of the RPWD 102 functionality through the use of network slicing provides opportunities to orchestrate a customized living space environment to suit a customized preference adapted to both static and dynamic choices configured and sensed via the RPWD 102, The network slicing facilitates an astute allocation of virtualized functions and resources (memory, spectrum, processing etc.) to serve and meet the demands of a customized usage and preference scenario. The innate flexibility, modularity and adaptability of the architectural context are highly beneficial/desirable for rendering a customized indoor environment over a variety of deployment scenarios.

The architectural context and model with a multi-RAT (Radio Access Technology) is beneficial/desirable for deployment flexibility, where the RPWD 102 capabilities are efficiently wirelessly communicated to the access and core network system, where information is effectively exchanged between the RPWD 102 and the access system over the UP (user plane), while the control signaling for system access and mobility occur over the CP (control plane). The multi-RAT technologies that serve as a heterogeneous communication system include, for example, 5GNR, 4G (LTE), and Bluetooth, and such wireless communication technologies provide a wide array of near and far range connectivity capabilities for the RPWD 102 with the ICCD 105 and the ACS 104.

The 5GNR beamforming capabilities of the gNB that harness low-frequencies (sub-6 GHz) for user data on the uplink, while utilizing beam-steering feedback control information on the millimeter-wave uplink, provides a robust and extended coverage for the RPWD for downlink data, on the millimeter-wave downlink with higher capacities, while facilitating wide-area coverage on low-frequencies (sub-6 GHz) with lower capacities associated with smaller packets of data.

The flexibility of 5GNR in concert with the 5GCN, provides the support for a variety of latency bounds, including ultra-low-latencies, together with virtualization modalities including edge computing, mixed media types and packet sizes for a variety of mobility and usage scenarios for the RPWD 102.

The availability of a distributed coordination using the "Xn" interface among eNBs and gNBs allows access for the RPWD 102 across the same or different administrative domains, where hosted domain to which the RPWD 102 belongs is served by a hosting domain to which the RPWD 102 is attached when the RPWD 102 is in a living space, which is away from the RPWD 102's native administrative domain for access to the ACS.

Figure 2:
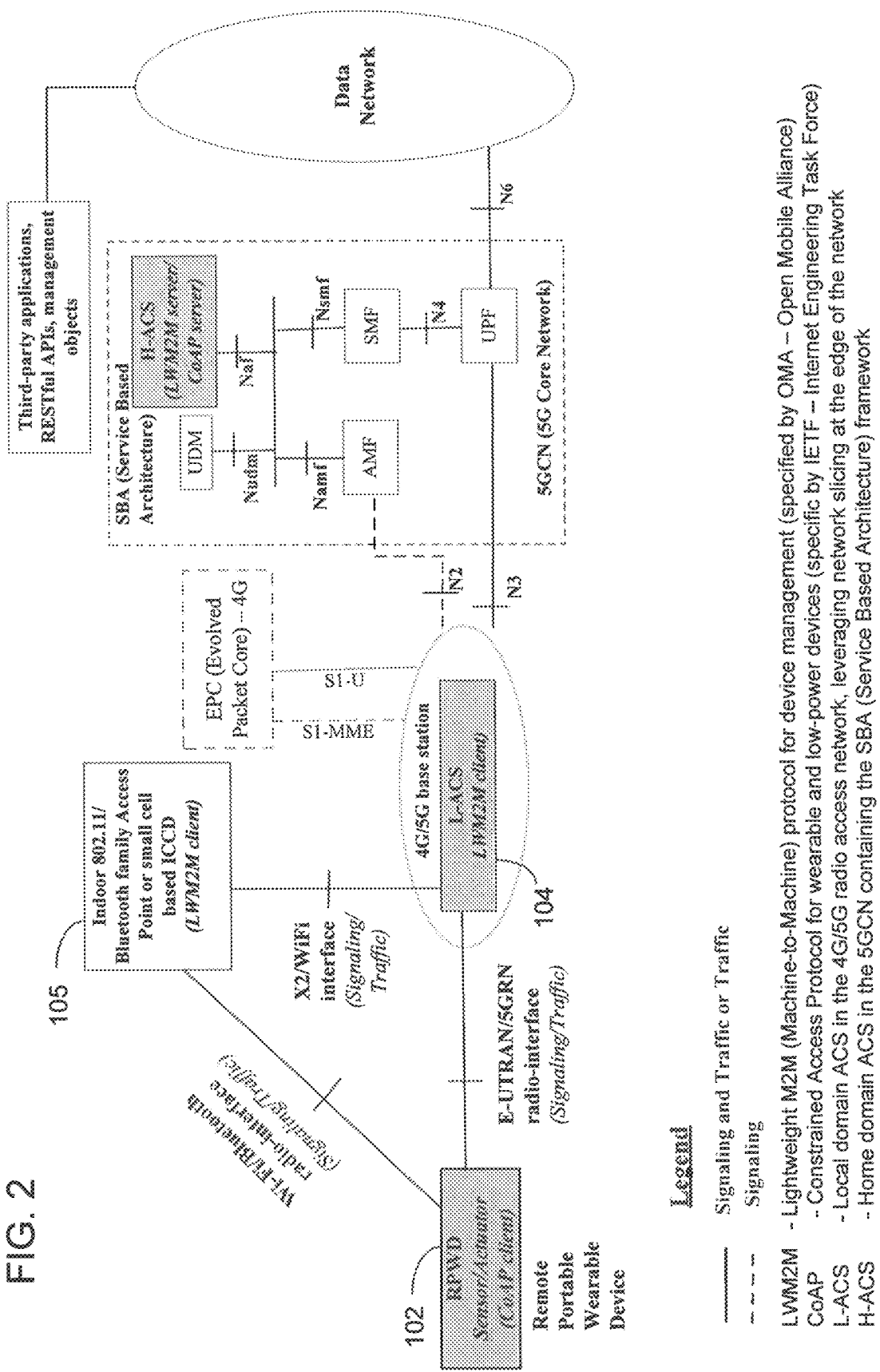
FIG. 2 is a further schematic diagram illustratively depicting another example of a mobile wireless network environment suitable for carrying out the described system.

With continued reference to FIGS. 1 and 2, the ACS 104 may communicate with the RPWD 102 over configurations of the gNB (over sub 6 GHz spectrum and millimeter wave spectrum) and the eNB (over sub 6 GHz spectrum), as specified in 3GPP TS 38300. The ACS 104 utilizes the sub 6 GHz spectrum for wide-area mobility. The ACS 104 utilizes the millimeter wave spectrum for ultra-low latency interactions with the RPWD 102. The ACS 104 utilizes the millimeter wave spectrum, where very high bandwidths on the order of 1 GHz could be leveraged to support medical imaging or other data for inferring remedial or preventive protocols, using different configurations of the RPWD 102 other than low-power wearables (e.g. large portable units), Additionally, the ACS 104 may utilize the gNB and eNB configurations in such a way that the downlink coverage of the gNB millimeter wave link coverage area is extended for a larger area support for accessing the RPWD 102, by limiting the uplink from the RPWD 102 to only "signaling" information, which reduces interkrence with downlink transmissions from the ACS 104 to the RPWD 102 to allow a higher power downlink transmission for information destined for the RPWD 102.

The ACS utilizes licensed as well as unlicensed spectrum for interactions with the RPWD to optimize operational costs, and maximize service revenue potential The RPWD utilizes the blockchain model for connecting with other non-local ACS domains to get access to diverse cost-optimized, high quality comfort and well-being services.

Having described an exemplary network environment, with reference to FIGS. 1 and 2, supporting/facilitating carrying out the described environmental control server and multi-user (biomarker data sources) system, attention is directed to operation of the identified elements to carry out an environment control arrangement.

The messaging framework between a RPWD client and the ACS server, includes LWM2M operations that leverage CoAP constructs of: GET, POST, PUT, DELETE etc. to carry out a configured control for adapting a potentially wide variety of environmental parameters including: ambient temperature, humidity, and air quality (de-ionizer), together with monitoring and guidance pertaining to customizable settings/profile for biomarkers for a realization of customized we parameters, In an illustrative example, the CoAP runs over a lightweight transport (e.g. UDP) with its own mechanisms for achieving reliability. By way of example, two bits in the header of each packet identify the type of message and the required Quality of Service (QoS) level, in the illustrative example (with two bits designating message types), the four message types consist of:
1. Confirmable: A request message that requires an acknowledgement (ACK). The response can be sent either synchronously (within the ACK) or if it needs more computational time, it can be sent asynchronously with a separate message.
2. Non-Confirmable: A message that does not need to be acknowledged,
3. Acknowledgment: It confirms the reception of a confirmable message.
4. Reset: It confirms the reception of a message that could not be processed.

The CoAP is based on the REST model, and the RPWD 102 uses the CoAP constructs of GET, PUT, POST, and DELETE for message interactions with the ACS 104.

Turning to FIG. 3, a table is provided that summarizes a set of fields of an exemplary user comfort status profile (UCSP) message sent by the RPWD 102 to the ACS 104 that conveys information processed by the ACS 104 before issuing commands via a second communication link between the ACS 104 and the ICCD 105 for controlling operation of the ICCD 105 in accordance with configured preferences and current biomarker parameters values associates with the user of the RPWD 102. In the illustrative example, the fields include: a description of service type (ST), a service type description (STD), a service parameter (SP), and a service action (SA). Thus, FIG. 3 summarizes the fields within the UCSP information optimized by the ACS and applied to the ICCD.

With continued reference to FIG. 3, the UCSP includes the LSCI and the UBI categories of service types, with their associated parameters, description and actions. Associations between service types and within service types are described as part of different and related control schemes and configurations of the system described herein. The UCSP may contain one or both types of ST, in addition to the RPWD identity and the user identity. The UCSP is conveyed by the RPWD 102 to the H-ACS, via the L-ACS in the 5GCN 106 over CoAP to optimize the comfort zone information in the UCSP, which is then transmitted (for carrying out a particular change to living space environment) automatically via the L-ACS messaging to the ICCD 105. In a manual operation mode, the UCSP is initiated by the RPWD 102 and applied to the ICCD 105 without processing by the ACS 104. The ICCD 105 responds with a corresponding SA (Service Action) to match, utilize, and adapt appropriately to the USCP contained in an ST request from the RPWD 102.

The software and firmware in the RPWD 102 and the ICCD 105 are managed and updated by LWM2M protocol interactions.

Figure 4:
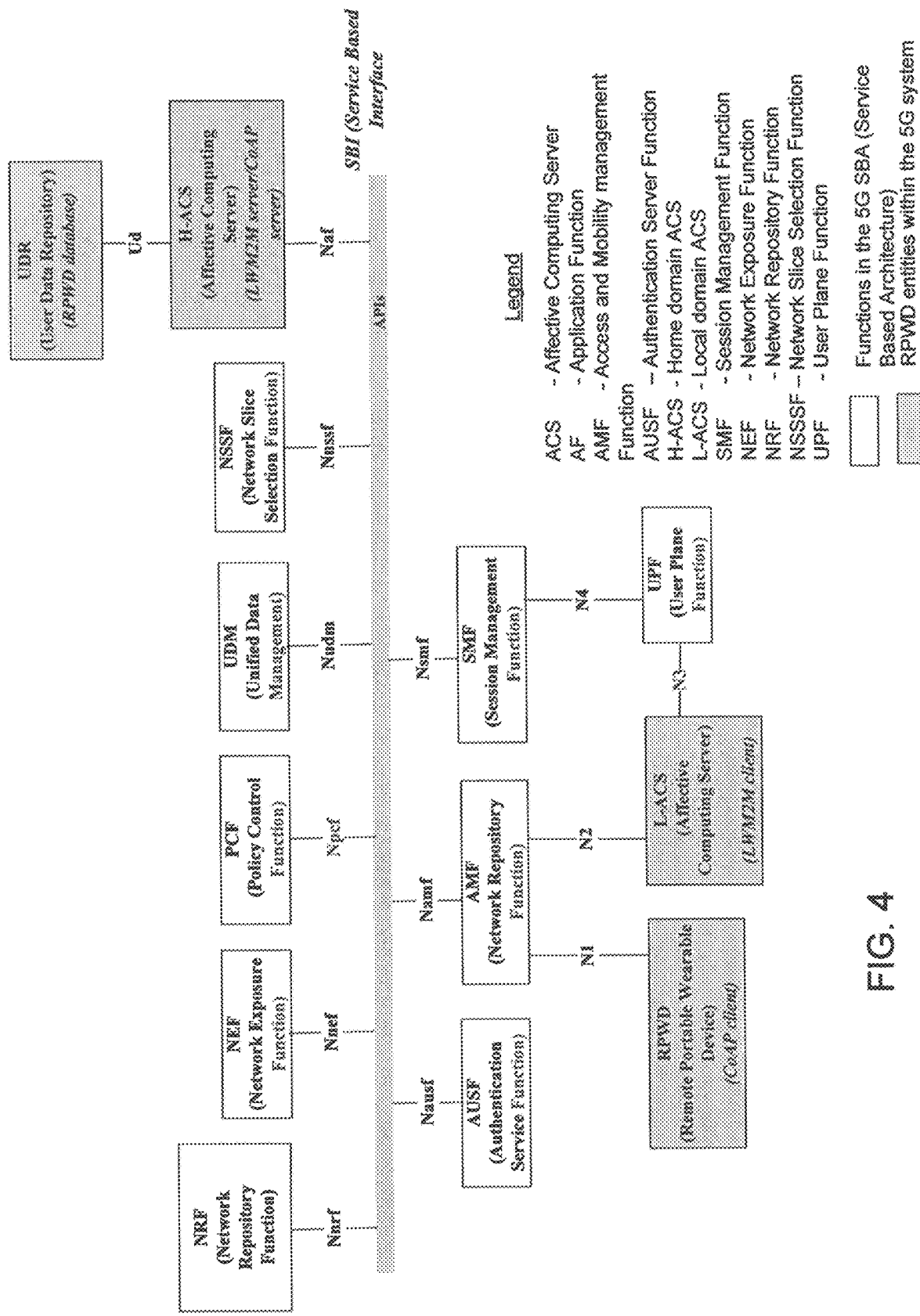
FIG. 4 is a schematic block diagram summarizes a set of functional and interface components of an illustrative example of a functional model of the SBA that is incorporated within a 5GCN hosting an ACS functionality (home ACS)

Turning to FIG. 4, a block diagram comprises a set of blocks that identify functional and interface components of an illustrative example of a functional model of the SBA that is incorporated within the 5GCN 106. The illustrative set of blocks support interactions between the RPWD 102, LACS, and the H-ACS.

Figure 5:
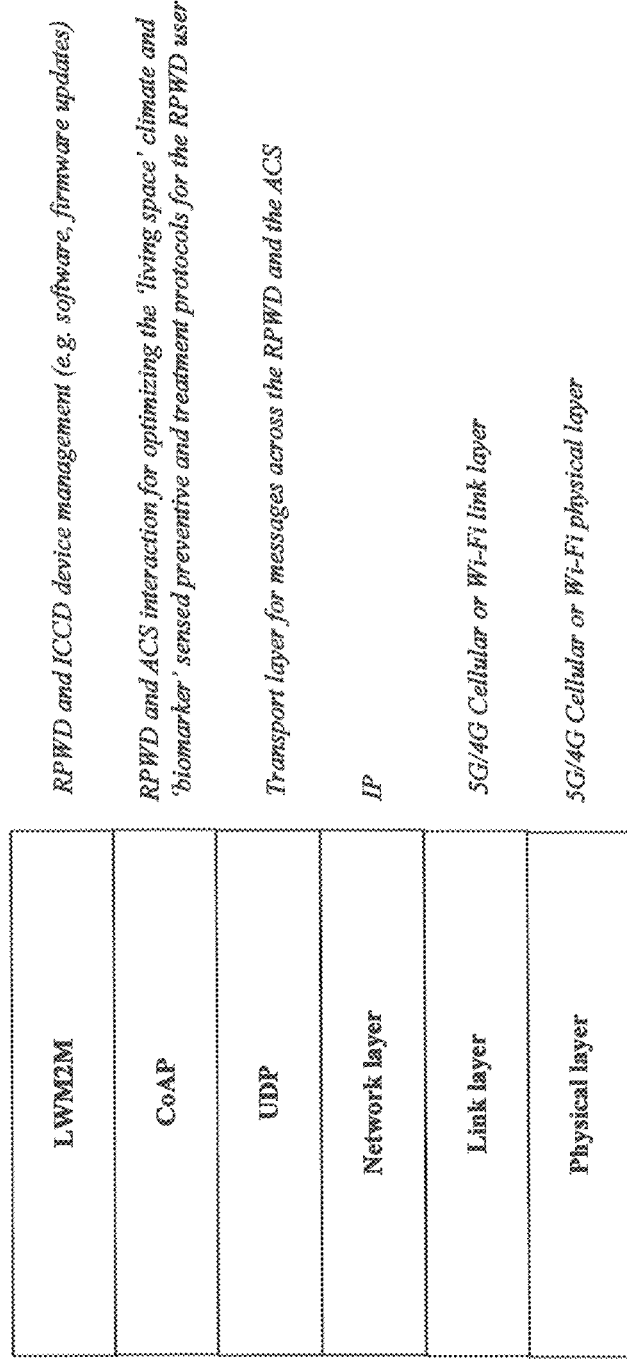
FIG. 5 summarizes an exemplary protocol stack associated with the communications between the RPWD and the ACS in accordance with embodiments of the present invention.

FIG. 5 summarizes the protocol stack applicable to the interactions between the RPWD and the ACS using an LWM2M over CoAP protocol stack configuration for UDP transport over Internet Protocol. In accordance with the exemplary embodiments, a wireless link (e.g. 5G/4G mobile wireless or Wi-Fi) link and physical layer of the OSI protocol stack are utilized.

Figure 6:
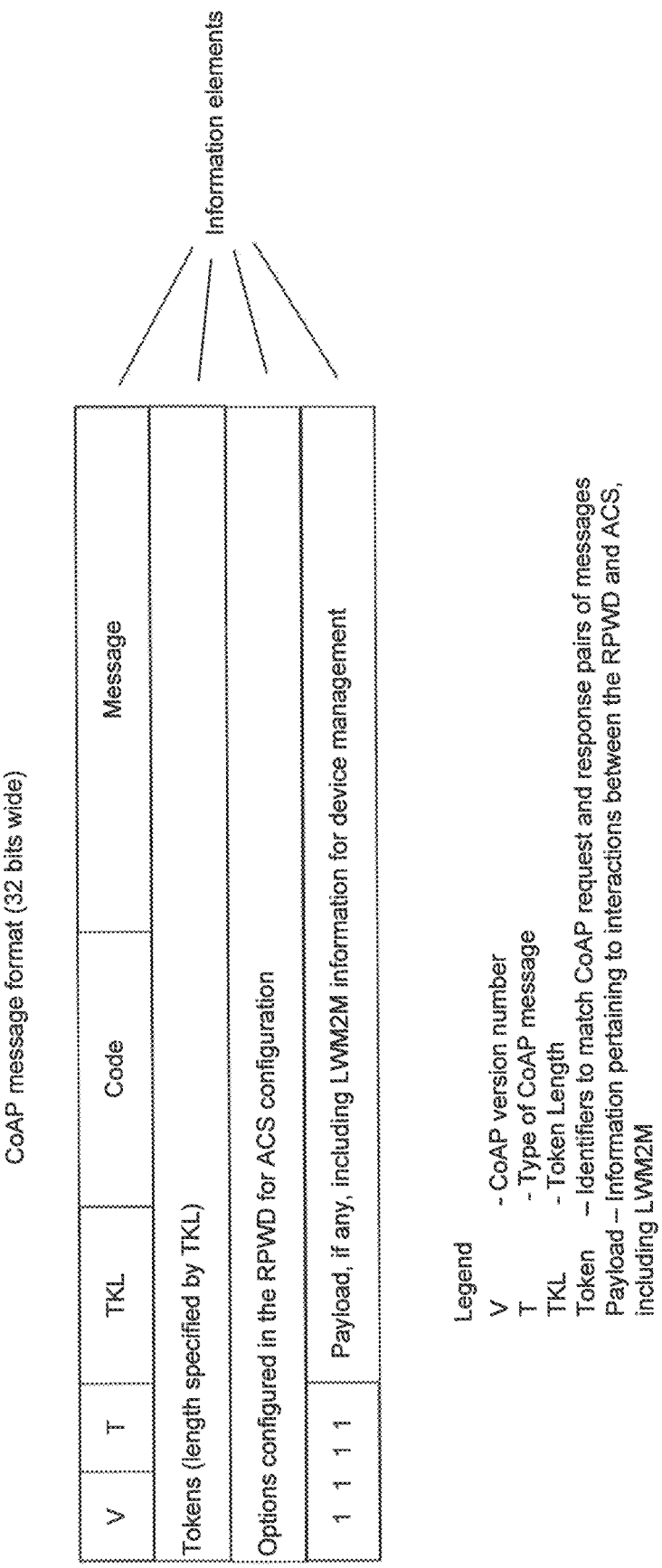
FIG. 6 summarizes an exemplary CoAP message format in accordance with an exemplary system.

Turning to FIG. 6, a set of fields are provided for the CoAP layer of the protocol stack depicted in FIG. 5. The fields, by way of example, include: CoAP version, CoAP message type, token length, token (identifying a request/response interaction), and CoAP payload (providing relevant information pertaining to the request/response interaction instance identified in the token).

Figure 7:
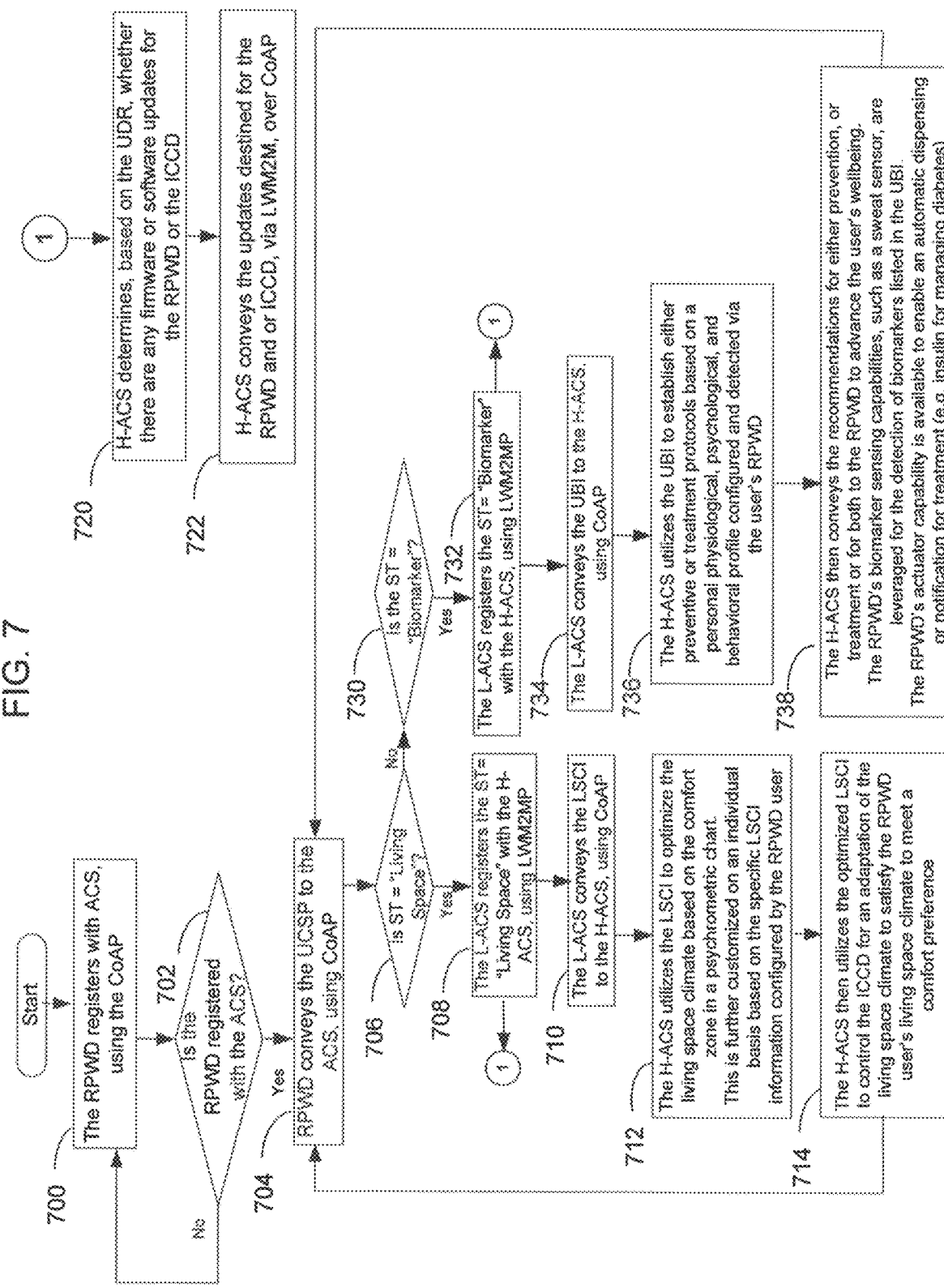
FIG. 7 is a flowchart summarizing operation of the summarizes cooperative operation of the RPWD to acquire and provide the UCSP for consumption/processing by the ACS to provide active/dynamic control of an ICCD or other device to aid comfort/well-being of a wearer of the RPWD according to a current set of information provided by a list of RPWD-specific UCSP's.

FIG. 7 is a flowchart summarizing cooperative operation of the RPWD 102, ACS 104 and ICCD 105 for determining and providing active control of an enclosed/climate-controlled environment and/or other device providing relief/aid to a wearer of the RPWD 102 in accordance with the current set of information in the UCSP (i.e. user comfort status profile) provided by the RPWD 102. During 700, the RPWD 102 registers/authenticates with the ACS 104 using the above-described CoAP messaging. Next, at 702 if the RPWD 102 successfully registered during 700, then control passes to 704. Otherwise, control passes from 702 back to 700. During 704, the RPWD 102 issues a UCSP message to the ACS via CoAP messaging to establish an initial set of parameters for user-specific configuration of the ICCD 105 based upon the preferences and status of a user associated with (e.g. "wearing") the RPWD 102. Next, at 706 if the ST (i.e. service type) is a living space, then control passes to 708.

During 708 the ACS 104 registers the indicated space type "living space". During 710 the ACS 104, operating in the role of the L-ACS, transmits an associated LSCI to an H-ACS located at, for example, the 5GCN 106. During 712 the H-ACS, based upon the provided LSCI, registers the RPWD 102 within the identified living space and seeks to define optimized climate set points within the identified living space currently occupied by the user of the RPWD 102. Moreover, during 714, in a collaborative user comfort optimization arrangement, the H-ACS simultaneously processes potentially different/conflicting UCSPs (including LSCIs) to render a collaborative set of control settings based upon the multiple sensed users corresponding to the multiple registered RPWDs within the same living space.

The H-ACS is later notified when a RPWD 102 leaves the current living space and control returns to 704 when the RPWD issues a new UCSP to the ACS. Moreover, in view of the change of occupant status in the living space previously occupied by the user of the RPWD 102, the H-ACS recalculates a set of control settings for the living space previously occupied by the RPWD 102.

A further branch from 708 leads to 720 wherein the H-ACS determines, based upon a provided UDR whether there are any program configuration updates to be incorporated into the RPWD 102 or the ICCD 105 and sends any appropriate updates using LWM2M over CoAP messaging.

Returning to 706, if the service type is "biomarker" (the only other service type in this illustrative example), then control passes to 730 wherein after confirming that the service type is indeed biomarker, control passes to 732. During 732 the L-ACS (e.g. ACS 104) registers the indicated biomarker value (representative of a current user of the RPWD 102 comfort level in a previously registered living space subject to environmental control using the ICCD 105) with the H-ACS. Control branches to both 720 discussed herein above as well as 734.

During 734 the L-ACS (e.g. ACS 104) conveys a UBI, previously provided by the RPWD 102, to the H-ACS via CoAP messaging. During 736 the H-ACS, based upon the provided UBI, establishes preventative/remedial actions based upon previously registered profile data for the user of the RPWD 102. During 738 the H-ACS issues requests/recommendations to one or both of the ICCD 105 and/or the RPWD 102 to improve the well-being, comfort, physical state of the user of the RPWD. Such remedial actions could be signaling the RPWD to cause a dispensing of a dose of medication (e.g. insulin, pain reliever, etc.) for the user. Thereafter, control returns to 704 when the RPWD issues a new UCSP to the ACS to facilitate processing the new UCSP.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject mater recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method carried out over a mobile wireless network for maintaining a comfort status of a user of a wearable device, the method comprising:
   registering, by an affective computing server (ACS), the wearable device associated with the user;
   receiving, by the ACS via a mobile wireless technology link, a user comfort status profile (UCSP) message issued by the wearable device, where the UCSP message includes at least a parameter value indicative of the comfort status of the user;
   processing, by the ACS, the UCSP message to render a comfort control request based upon the UCSP; and
   sending, by the ACS, the comfort control request to an actuator for affecting a change in the comfort status of the user of the wearable device.

2. The method of claim 1 wherein the parameter value indicative of the comfort status is a living space environmental status indicator.

3. The method of claim 1 wherein the parameter value indicative of the comfort status is a biomarker value indicative of wellbeing of the user of the wearable device.

4. The method of claim 3 wherein the UCSP is transmitted in a constrained application protocol (CoAP) message over the 5G mobile wireless technology link.

5. The method of claim 1 wherein the mobile wireless technology link is a 5G mobile wireless technology link.

6. The method of claim 2 wherein the wearable device is an edge computing device that communicates with the ACS via the 5G mobile wireless technology link.

7. The method of claim 1 wherein the ACS provides program configuration updates to the wearable device or the actuator using light weight machine to machine (LWM2M) protocol messaging.

8. The method of claim 7 wherein an ACS-to-wearable device messaging is steered to wireless transmission resources according to a spectrum utilization rules configuration and current sensed mobility status of the wearable device.

9. The method of claim 1 wherein a hosting by the ACS is determined based upon capabilities at a local multi-access edge computing network, for a seamless wearer device user experience, where a determination of whether to use a home domain ACS (H-ACS) or a local domain ACS (L-ACS) is based on a smart contract between a local network service provider associated with the L-ACS and a core network service provider associated with the H-ACS, where the smart contract contains a service-level agreements between peer entities.

10. The method of claim 9 wherein the smart contract uses a blockchain protocol, and a curated user data repository (UDR).

11. The method of claim 1 wherein the ACS utilizes different network slice types of a 5G network based upon particular quality of service requirements for messaging between the wearable device and the ACS.

12. The method of claim 1 wherein the wearable device incorporates a Representational State Transfer (REST) oriented application programming interface for interacting with the ACS.

13. The method of claim 1 wherein the ACS communicates with the wearable device over configurations of:
   a gNB over sub 6 GHz spectrum and millimeter wave spectrum, and
   an eNB over sub 6 GHz spectrum.

14. The method of claim 1 wherein the actuator is an indoor climate control device.

15. The method of claim 14 wherein the indoor climate control device is a heating, ventilation and air conditioning system.

16. The method of claim 1 wherein the actuator is a personal medical treatment device.

17. The method of claim 1 wherein, during the sending, the comfort control request is sent over a mobile wireless technology.

18. A non-transitory computer-readable medium including computer-executable instructions for carrying out a method over a mobile wireless network for maintaining a comfort status of a user of a wearable device, the method comprising:
   registering, by an affective computing server (ACS), the wearable device associated with the user;
   receiving, by the ACS via a mobile wireless technology link, a user comfort status profile (UCSP) message issued by the wearable device, where the UCSP message includes at least a parameter value indicative of the comfort status of the user;
   processing, by the ACS, the UCSP message to render a comfort control request based upon the UCSP; and
   sending, by the ACS, the comfort control request to an actuator for affecting a change in the comfort status of the user of the wearable device.

19. An affective computing server (ACS) incorporated into a mobile wireless network management infrastructure, the ACS comprising:
   a processor; and
   a non-transitory computer-readable medium including computer-executable instructions for carrying out a method over a mobile wireless network for maintaining a comfort status of a user of a wearable device, the method comprising:
      registering, by the ACS, the wearable device associated with the user;
      receiving, by the ACS via a mobile wireless technology link, a user comfort status profile (UCSP) message issued by the wearable device, where the UCSP message includes at least a parameter value indicative of the comfort status of the user;
      processing, by the ACS, the UCSP message to render a comfort control request based upon the UCSP; and
      sending, by the ACS, the comfort control request to an actuator for affecting a change in the comfort status of the user of the wearable device.

20. The ACS of claim 19 wherein, during the sending, the comfort control request is sent over a mobile wireless technology.

* * * * *